March 14, 1950     J. B. KENDRICK     2,500,689
COUPLED CONTROL SURFACE FOR AIRCRAFT
Filed Feb. 5, 1945     2 Sheets-Sheet 1
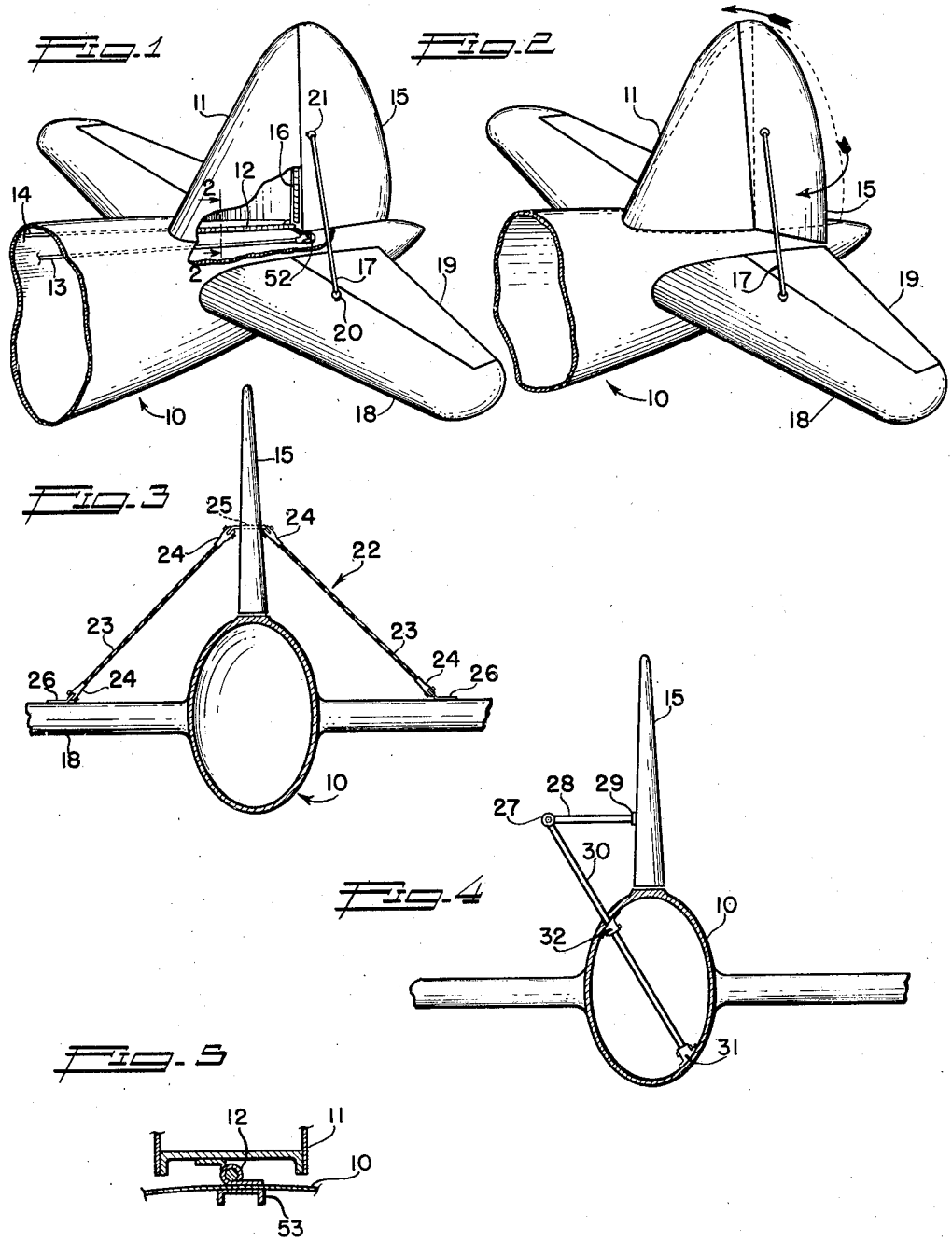
INVENTOR.
JAMES B. KENDRICK
BY
George Sullivan
Agent March 14, 1950     J. B. KENDRICK     2,500,689
COUPLED CONTROL SURFACE FOR AIRCRAFT
Filed Feb. 5, 1945     2 Sheets-Sheet 2
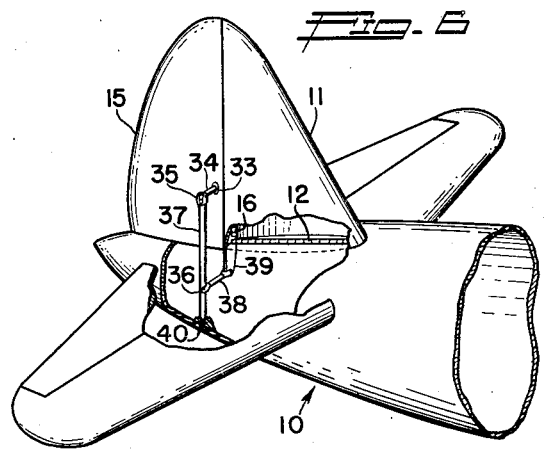
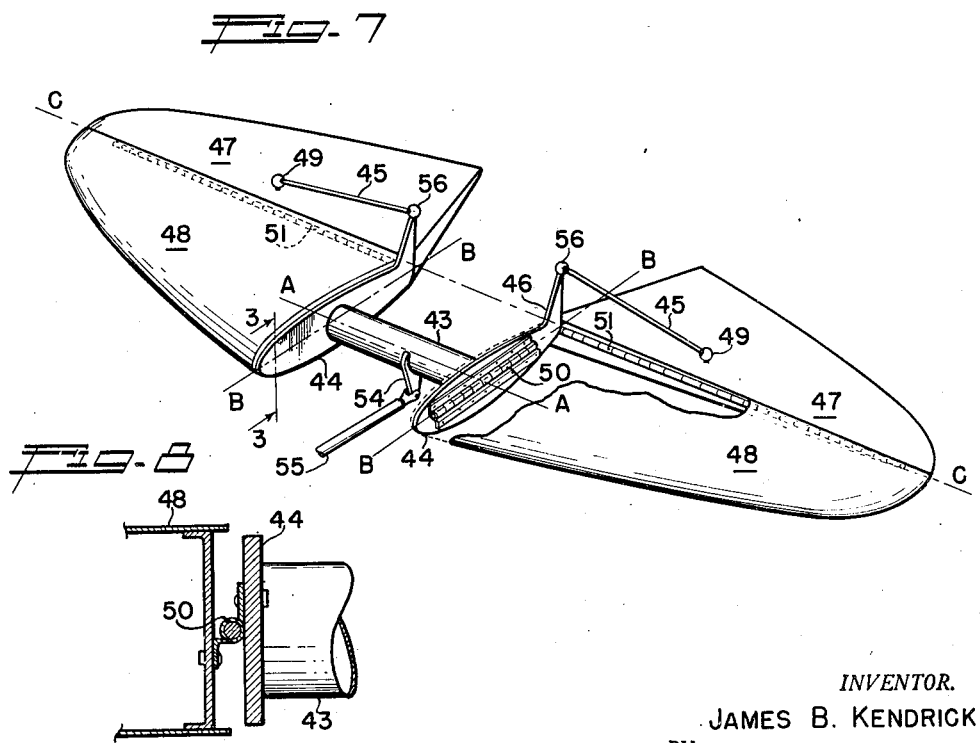
INVENTOR.
JAMES B. KENDRICK
BY
*George C. Sullivan*
Agent Patented Mar. 14, 1950

2,500,689

UNITED STATES PATENT OFFICE 2,500,689

COUPLED CONTROL SURFACE FOR AIRCRAFT

James B. Kendrick, Burbank, Calif., assignor to Lockheed Aircraft Corporation, Burbank, Calif.

Application February 5, 1945, Serial No. 576,333

5 Claims. (Cl. 244—87)

This invention relates to airplane control surfaces and more especially to means whereby the stability of the plane while in flight may be improved.

In order to provide improved stability, tail areas are being made larger and larger, resulting in excessive weight and drag. I have found that when the coupling means are installed on an airplane, the effectiveness of a tail surface may be increased by 100 per cent or more over that of a fixed surface of equal size. The principal effect of the coupling is to increase the stability of the airplane by a considerable margin in the vicinity of the trim condition, whereas at wider angles the stability resumes its original characteristics. This set of conditions provides the stability needed for good airspeed control and riding comfort, without involving excessively large surface areas or high control forces.

It is an object of this invention to increase the effectiveness of the vertical tail in such a way that rudder movement aids the normal restoring moment of the tail, when subjected to sideslip.

Another object of the invention is to increase the longitudinal static stability of the airplane so that variations due to center of gravity movement have only moderate effect on the stability.

Another object of the invention is to quickly correct variations in angle of attack or yaw, or changes in velocity, and thus tend to damp out disturbances promptly.

A further object of the invention is to reduce the resulting vertical motion when an airplane strikes an up or down gust.

Other objects and advantages of the invention will become apparent from the following detailed description of typical preferred forms of the invention in which reference will be made to the accompanying drawings, and in which like numerals are employed to designate like parts throughout the same.

Figure 1 is a perspective view of an empennage embodying one method of installing the coupling means on the vertical tail, Figure 2 is a view corresponding to Figure 1 showing the surfaces in position when the plane is flying at an angle of yaw, Figures 3 and 4 are transverse sections through the fuselage showing alternate methods of installing the coupling means for the rudder, Figure 5 is an enlarged fragmentary vertical detailed sectional view taken as indicated by line 2—2 of Figure 1, Figure 6 is a perspective view of an empennage illustrating another alternate method of installing the coupling means on the vertical tail, Figure 7 is a fragmentary perspective view showing one method of installing the coupling means on the horizontal tail, and Figure 8 is an enlarged fragmentary vertical detailed sectional view taken as indicated by line 3—3 on Figure 7.

The invention provides several forms of coupling means for use with the vertical tail. Figure 1 of the drawings, shows the empennage of an airplane comprising the rear end portion of the fuselage 10, and the vertical fin 11. In accordance with the invention, the fin 11 is tiltable on a hinge 12, and the rudder 15 is swingably operable by the pilot by means of the pivotable arm 52 and control cables 13 and 14. A hinge 16 attaches the rudder 15 to the fin 11 substantially at its trailing edge. The empennage further comprises the fixed horizontal stabilizer 18 and the elevator 19. The invention includes a coupling link 17, extending between the rudder 15 and the fixed horizontal stabilizer 18. The coupling link 17, preferably a rigid bar, is attached by means of a ball and socket connection 20 to the frame of the fixed horizontal stabilizer 18, and attached by means of a ball and socket connection 21 to the frame of the rudder 15.

Another embodiment of the coupling means for the vertical tail is illustrated in Figure 3, wherein the coupling means 22, preferably includes lengths of cable 23 and terminals 24. The terminals are bolted on both sides of rudder 15 to bracket 25, and are bolted to brackets 26 mounted on the fixed horizontal stabilizer 18. The location of the points of attachment of coupling links 22 fore and aft, are substantially the same as the attachment points for the coupling link 17 shown in Figure 1. The attachment and operation of the fin and rudder are the same as shown in Figure 1.

A further modification of the embodiment of the coupling means for the vertical tail is illustrated in Figure 4. An arm 30 fixedly attached to fuselage 10 by bracket 31 and bracket 32, and an arm 28 attached to rudder 15 by a ball and socket connection 29, are linked at 27. The location of the ball and socket connection 29 on rudder 15 is in substantially the same location fore and aft, as the ball and socket connection 21 shown in Figure 1. The attachment and operation of the fin and rudder are the same as shown in Figure 1.

Figure 5 shows one method of tiltably attaching the vertical fin 11, by means of hinge 12, to the fuselage 10 and the stiffener channel 53 of the fuselage structure.

The embodiment of the coupling means for the vertical tail could be further modified as shown in Figure 6. Arm 37, pivotally supported at 40 on fuselage 10, is linked to arm 38 at 36, and linked to arm 34 at 35. Arm 34 is attached to fin 15 by a ball and socket connection 33, and arm 38 is pivotally attached at 39 to a portion of fin 11 extending below the hinge 12. The attachment and operation of the fin and rudder are the same as shown in Figure 1.

In Figure 7 is shown a preferred form of the coupling means as used in connection with the horizontal tail. The shaft 43, connected to and actuated by the cockpit controls by means of horn 54 and rod 55, rotates about its own axis. The arms 44, rigidly attached to shaft 43, are connected to stabilizer 48 by hinge 50. Stabilizer 48 rotates about the axis of the shaft 43, and tilts on hinge 50. Elevator 47 is attached to stabilizer 48 by means of hinge 51. The coupling link 45, preferably a rigid bar, is connected to bracket 46 by means of a universal joint at 56, and attached to the elevator 47 by a ball and socket connection 49. Bracket 46 is rigidly attached to or is formed integral with the mounting bracket 44.

Figure 8 shows one method of tiltably attaching the stabilizer 48 to arm 44 mounted on shaft 43.

Figure 2 is shown for the purpose of illustrating the principles governing the application of the invention to a vertical tail. The directional stability provided by the vertical tail represents an important factor in determining the flying qualities of an airplane. The control surfaces are set to give the desired flight direction by operating the normal directional controls in the cockpit. When the airplane flies at an angle of yaw, the vertical fin 11 tilts from the normal position as shown by the dotted lines, to a position such as shown by the solid lines. The coupling link 17, attached to the rudder 15 and the fixed horizontal stabilizer 18, or other suitable point, causes the rudder to deflect in a direction opposite to the direction of tilt of the vertical fin. This automatic deflection of the rudder creates a resistance to sideslip, and the "feel" thereof is transmitted back to the pilot through the rudder control cables 13 and 14.

The principle of coupling applies equally well to horizontal or vertical tail surfaces. The coupled elevator provides a powerful, leading control which cannot be obtained with a conventional tail. Normal stick control changes the stabilizer setting to give the desired airspeed of flight path angle. After setting the stabilizer for the desired airspeed, the high static stability resulting from the coupled elevator will hold that airspeed automatically, more closely than with normal stability. Referring to Figure 7, the stabilizer surface 48 rotates about line A—A when actuated by the longitudinal control system or by changes in angle of attack. Each of the tail half-panels tilt on B—B when the angle of attack changes. The tilt causes movement of the elevator on C—C, actuated by coupling link 45 or other suitable mechanism, in a direction opposite to the direction of tilt of the stabilizer, and quickly corrects the variation in angle of attack and/or velocity. Since the coupled elevator increases the free-control static stability, the resulting vertical motion when the airplane strikes an up or down gust will be less severe, and the static stability will be increased to a point where variations due to center of gravity movement have only moderate effect on the stability. If rapid control of flight path angle is desired, as in landing, normal stick control is used.

The movable control surfaces operable by the pilot have been designated as the rudder and the stabilizer, but it is to be understood that I am not limited to these surfaces, but that my invention will also apply if the hinged surfaces and the coupling means remain as shown, and the cockpit controls are installed so as to control the movement of the fin and the elevator.

While I have described herein some embodiments of my invention, I wish it to be understood that I do not intend to be limited to the specific details herein set forth, but wish to reserve to myself any variations or modifications that may appear to those skilled in the art or fall within the scope of the following claims.

I claim:

1. In combination with an airplane structure, a tail surface hingedly connected thereto, a movable control surface hinged to the tail surface substantially at right angle to the tail surface connection, control means to move said control surface, and means coupling the movable control surface to a substantially rigid portion of the airplane structure to deflect the movable control surface in a direction opposite to that in which the tail surface tilts during flight.

2. In combination with an airplane structure, a control surface tiltably mounted about an axis parallel to the direction of flight of said airplane thereon, a second control surface hingedly attached to the first control surface at substantially right angles to the axis thereof, and linkage interconnecting said second control surface to the airplane structure in spaced relationship to the axis of the first control surface whereby to automatically deflect the second control surface in a direction opposite to that in which the first surface tilts during flight.

3. In combination with an airplane structure, a tail surface hingedly connected thereto about an axis parallel to the direction of flight of the airplane, a movable surface hinged to the tail surface substantially at right angle to the tail surface connection, and biasing linkage connecting said movable surface to the airplane structure whereby to automatically deflect the movable surface when the tail surface tilts during flight.

4. In combination with an airplane structure, a control surface tiltably mounted about an axis parallel to the direction of flight of the airplane, a second control surface hingedly connected to the first control surface at right angles to the axis thereof, and a pivotal connection between said second control surface and said airplane structure adapted to automatically deflect the second control surface when the first control surface tilts during flight.

5. In combination with an airplane structure, a horizontal stabilizer tiltably attached thereto about an axis parallel to the direction of flight of the airplane, mounting means for permitting rotation of the stabilizer substantially at right angles to the direction of tilt, an elevator hinged to the stabilizer substantially at its trailing edge, and a coupling link between the elevator and said mounting means to deflect the elevator when the stabilizer tilts during flight.

JAMES B. KENDRICK.

(References on following page)

REFERENCES CITED

The following references are of record in the file of this patent:

UNITED STATES PATENTS

| Number | Name | Date |
|---|---|---|
| 1,334,707 | Martin | Mar. 23, 1920 |
| 1,353,212 | Boiler | Sept. 21, 1920 |
| 1,492,304 | Martin | Apr. 29, 1924 |
| 1,524,352 | Gephart | Jan. 27, 1925 |
| 1,574,567 | Flettner | Feb. 23, 1926 |
| 1,859,306 | Loening | May 24, 1932 |
| 2,313,800 | Burroughs | Mar. 16, 1943 |
| 2,353,962 | Koppen | July 18, 1944 |
| 2,357,465 | Focht | Sept. 5, 1944 |

FOREIGN PATENTS

| Number | Country | Date |
|---|---|---|
| 162,930 | Great Britain | May 12, 1921 |
| 448,827 | Great Britain | June 16, 1936 |
| 839,422 | France | Jan. 4, 1939 |